US011470267B2

(12) United States Patent
Lamkin et al.

(10) Patent No.: US 11,470,267 B2
(45) Date of Patent: Oct. 11, 2022

(54) OPTICAL FOVEATION FOR INTEGRAL IMAGING

(71) Applicant: FYR, Inc., Fort Worth, TX (US)

(72) Inventors: Mark Andrew Lamkin, Fort Worth, TX (US); Kyle Martin Ringgenberg, Fort Worth, TX (US); Jordan David Lamkin, Fort Worth, TX (US)

(73) Assignee: FYR, Inc., Fort Worth, TX (US)

( * ) Notice: Subject to any disclaimer, the term of this patent is extended or adjusted under 35 U.S.C. 154(b) by 0 days.

(21) Appl. No.: 17/380,951

(22) Filed: Jul. 20, 2021

(65) Prior Publication Data

US 2022/0030176 A1      Jan. 27, 2022

Related U.S. Application Data

(60) Provisional application No. 63/054,916, filed on Jul. 22, 2020.

(51) Int. Cl.
*H04N 5/235*     (2006.01)
*H04N 5/265*     (2006.01)
*H04N 5/225*     (2006.01)
*H04N 5/232*     (2006.01)
*G06T 7/80*      (2017.01)

(52) U.S. Cl.
CPC .............. *H04N 5/265* (2013.01); *G06T 7/80* (2017.01); *H04N 5/2254* (2013.01); *H04N 5/2256* (2013.01); *H04N 5/23229* (2013.01)

(58) Field of Classification Search
CPC .................................................. H04N 5/22541
See application file for complete search history.

(56) References Cited

U.S. PATENT DOCUMENTS 10,690,910 B2 *   6/2020   Lamkin ................. G06F 3/1446
2021/0021785 A1 *  1/2021   Cutler .................... H04N 7/155

* cited by examiner

*Primary Examiner* — Gary C Vieaux
(74) *Attorney, Agent, or Firm* — Baker Botts L.L.P.

(57) ABSTRACT

A system includes an image sensor coupled to a first optical distortion element, a processing unit, and an electronic display coupled to a second optical distortion element. The image sensor is configured to receive, using a plurality of sensor pixels, a portion of an incoming light field through the first optical distortion element and generate a distorted digitized image from the received portion of the incoming light field. The processing unit is configured to generate a distorted virtual image and to generate a processed distorted image by mixing the distorted virtual image and the distorted digitized image. The electronic display is configured to display, using a plurality of display pixels, the processed distorted image through the second optical distortion element. The second optical distortion element is configured to undistort the processed distorted image in order to produce a portion of an emitted light field.

20 Claims, 5 Drawing Sheets

OPTICAL FOVEATION FOR INTEGRAL IMAGING

PRIORITY

This application claims the benefit under 35 U.S.C. § 119(e) of U.S. Provisional Patent Application No. 63/054,916, filed 22 Jul. 2020, which is incorporated herein by reference in its entirety.

TECHNICAL FIELD

The present disclosure relates generally to imaging systems, and more specifically to optical foveation systems and methods for integral imaging.

BACKGROUND

Attaining visual acuity with a traditional integral imaging based light field display is currently impractical. Doing so requires either an extremely narrow field of view, or an extremely small pixel pitch. The former presents an uncompelling user experience, and the latter is costly to manufacture and virtually impossible for which to generate content.

SUMMARY

The embodiments of the disclosure provide novel optical foveation systems and methods for integral imaging. In some embodiments, a system includes an image sensor coupled to a first optical distortion element, a processing unit, and an electronic display coupled to a second optical distortion element. The image sensor is configured to receive, using a plurality of sensor pixels, a portion of an incoming light field through the first optical distortion element and generate a distorted digitized image from the received portion of the incoming light field. The processing unit is configured to generate a distorted virtual image and to generate a processed distorted image by mixing the distorted virtual image and the distorted digitized image. The electronic display is configured to display, using a plurality of display pixels, the processed distorted image through the second optical distortion element. The second optical distortion element is configured to undistort the processed distorted image in order to produce a portion of an emitted light field.

In another embodiment, a method for rendering an image using optical foveation includes selecting a target resolution distribution, selecting one or more optical elements, rendering an integral image on a display in a foveal distortion (e.g., barrel distortion) such that pixels are disproportionally allocated to a particular region (e.g. center), and using the selected optical elements to undistort the foveated image.

The disclosed embodiments provide several practical applications and technical advantages, which include at least: 1) allowing the perception of visual acuity while rendering and displaying fewer pixels, and 2) reducing the number of pixels that must be packed within a given area under an optical element used for integral imaging.

Certain embodiments may include none, some, or all of the above technical advantages and practical applications. One or more other technical advantages and practical applications may be readily apparent to one skilled in the art from the figures, descriptions, and claims included herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
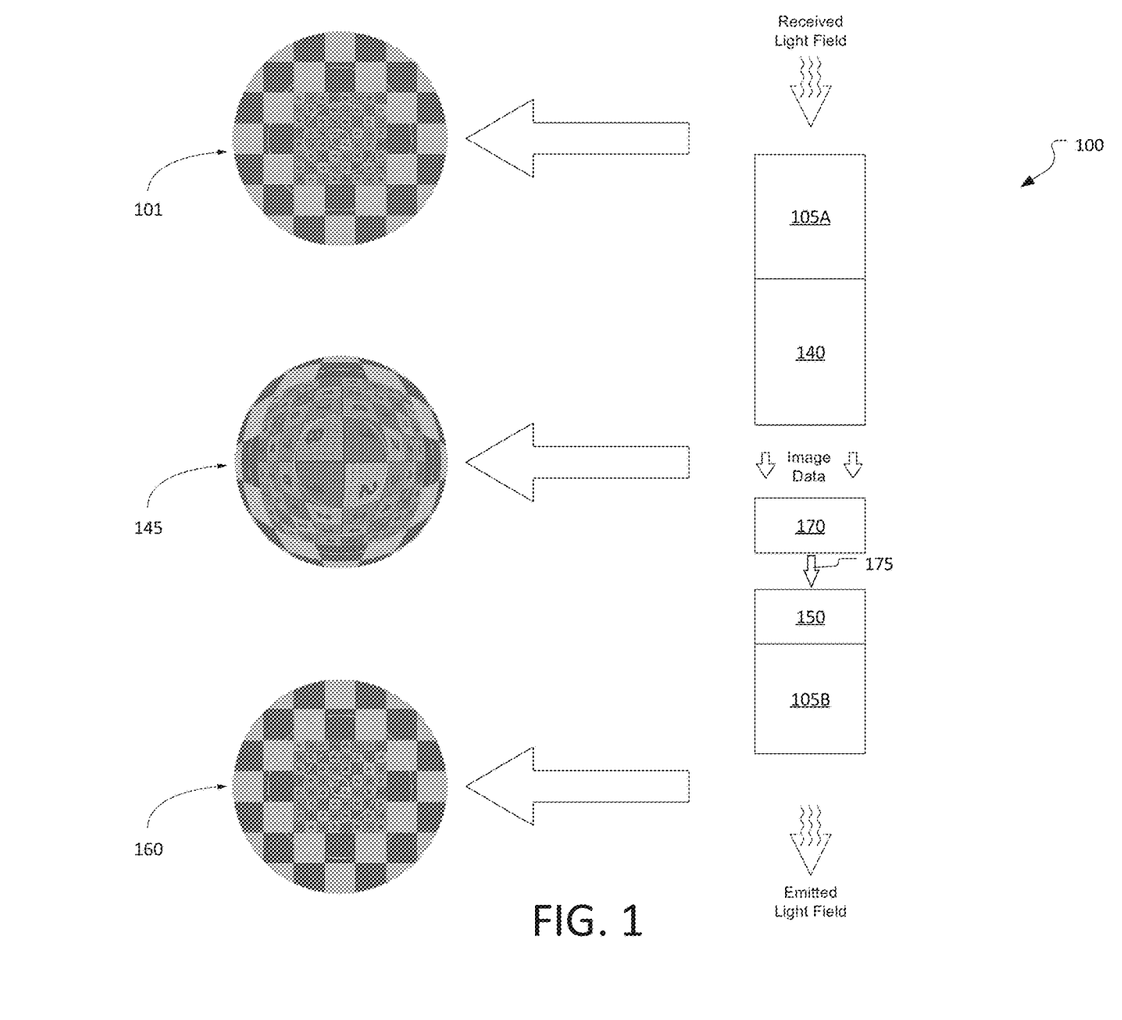
FIG. 1 illustrates an example optical foveation system, according to certain embodiments.
Figure 2A:
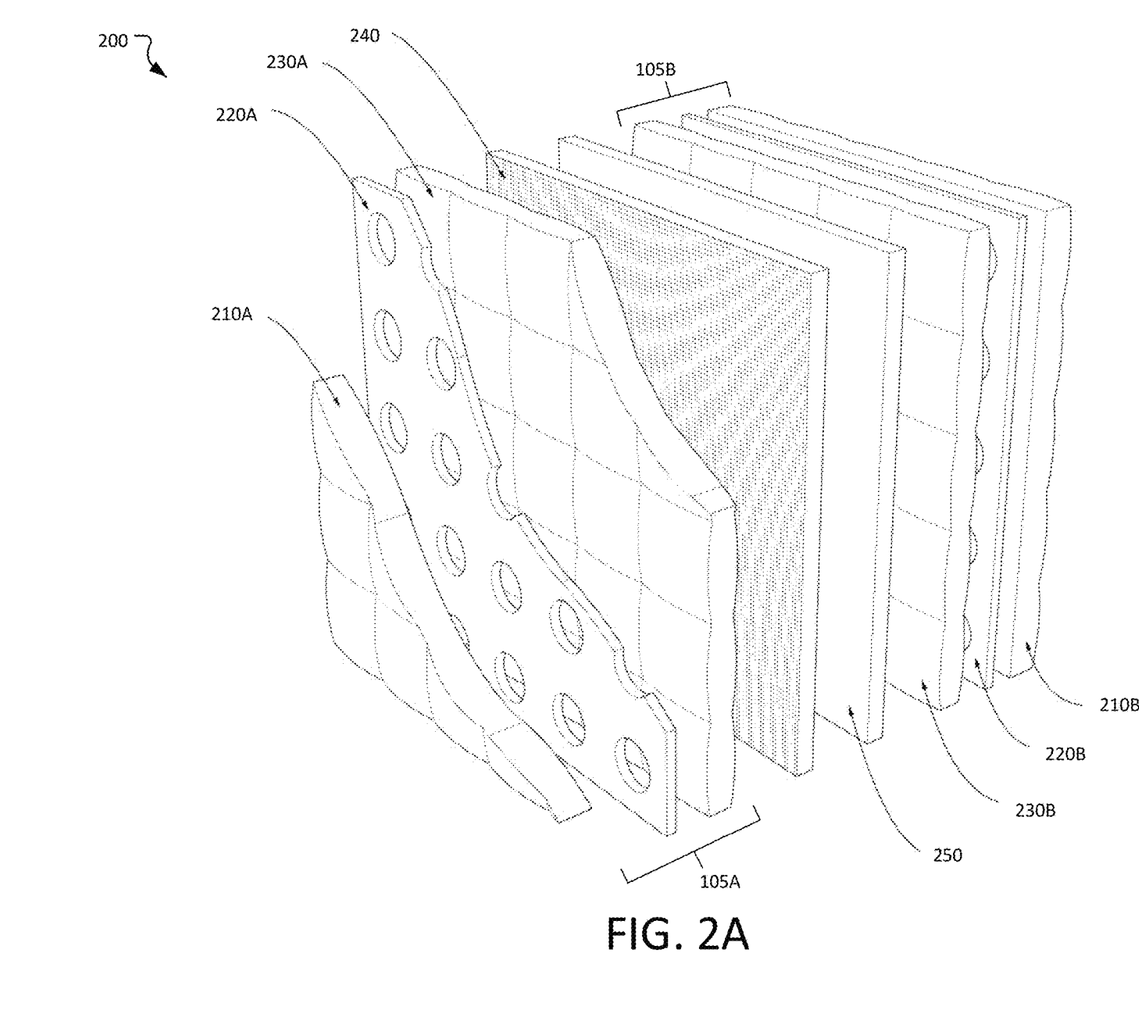
FIGS. 2A-2C illustrate a specific embodiment of the optical foveation system of FIG. 1, according to certain embodiments.
Figure 2B:
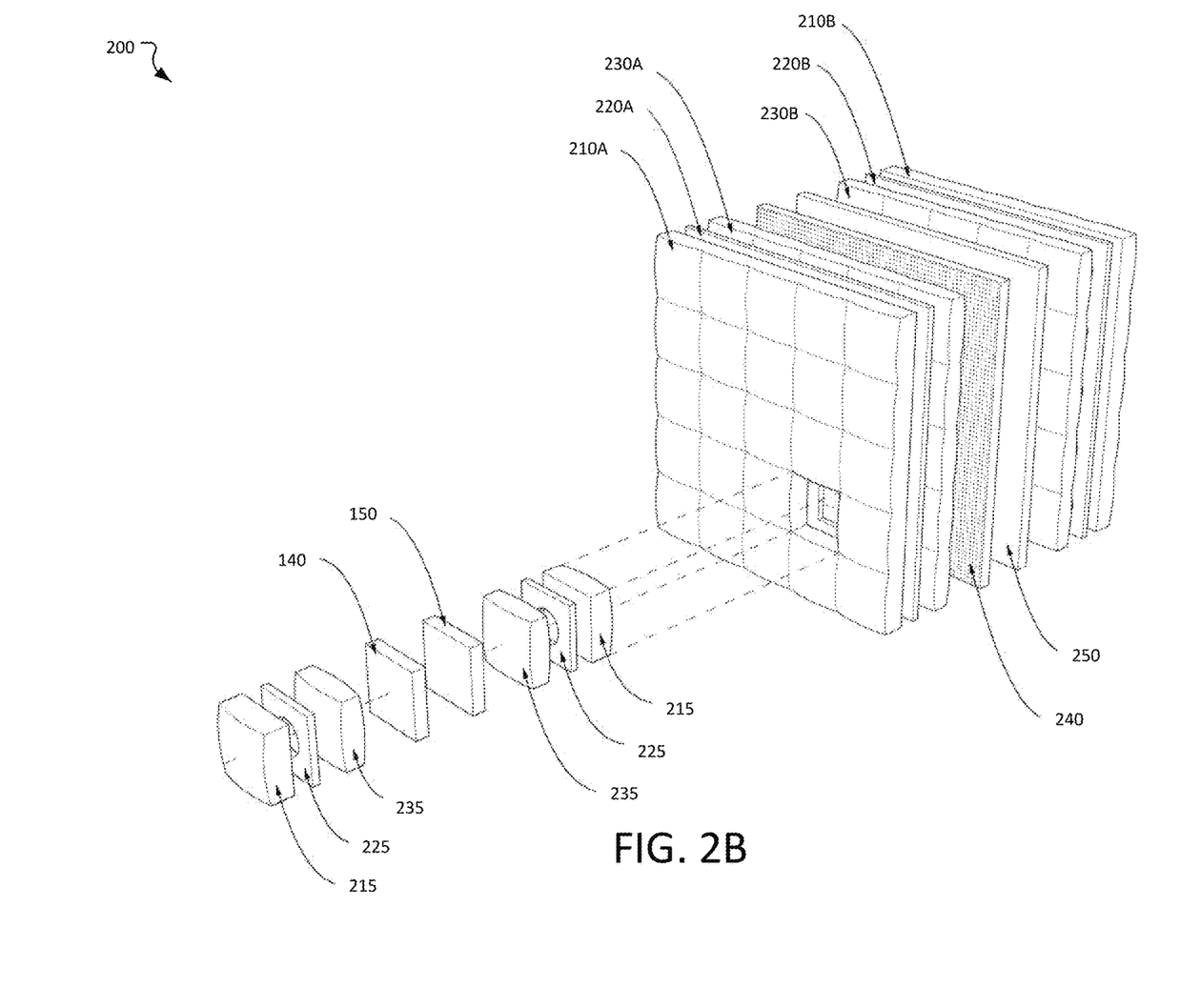
Figure 2C:
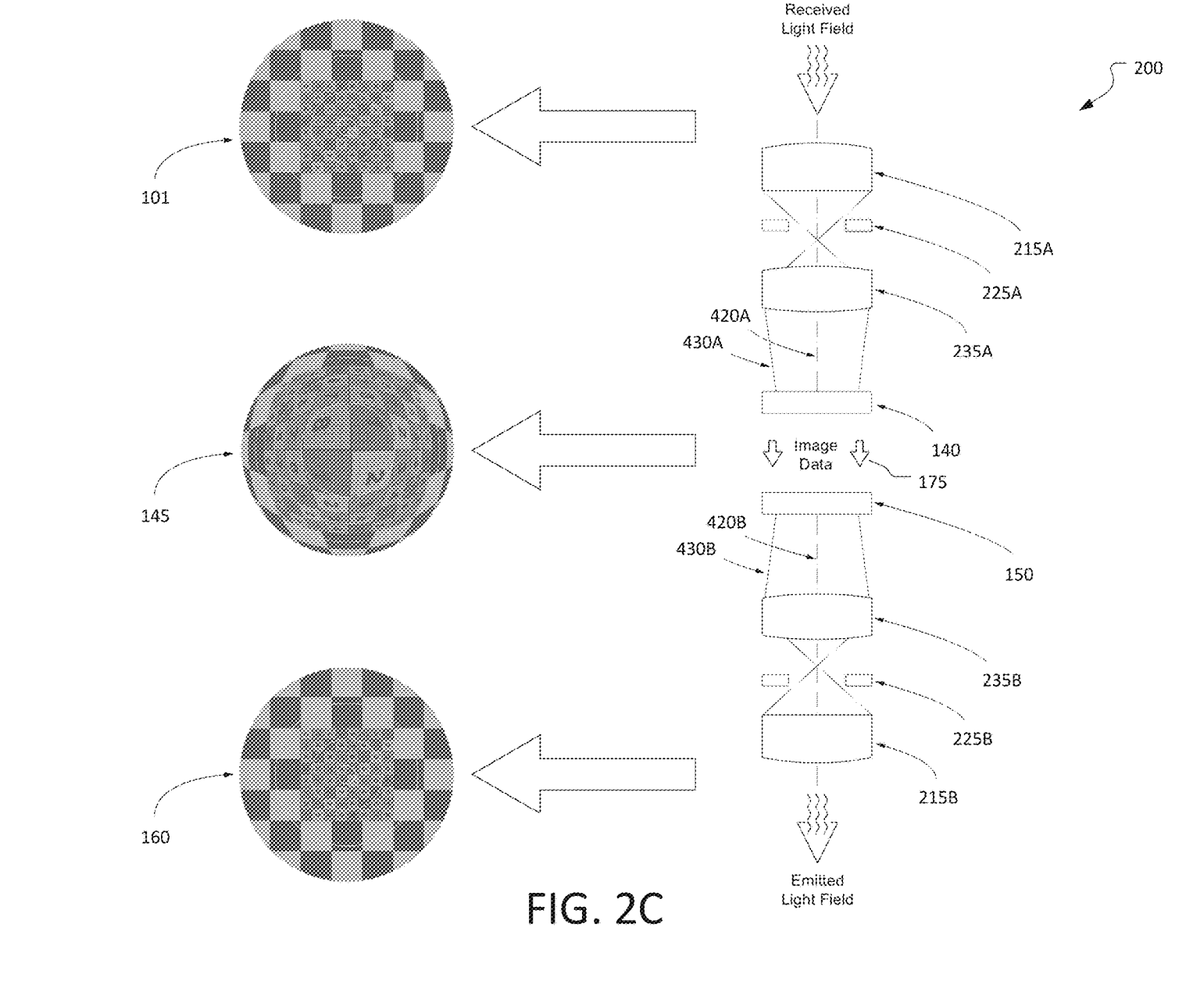
Figure 3:
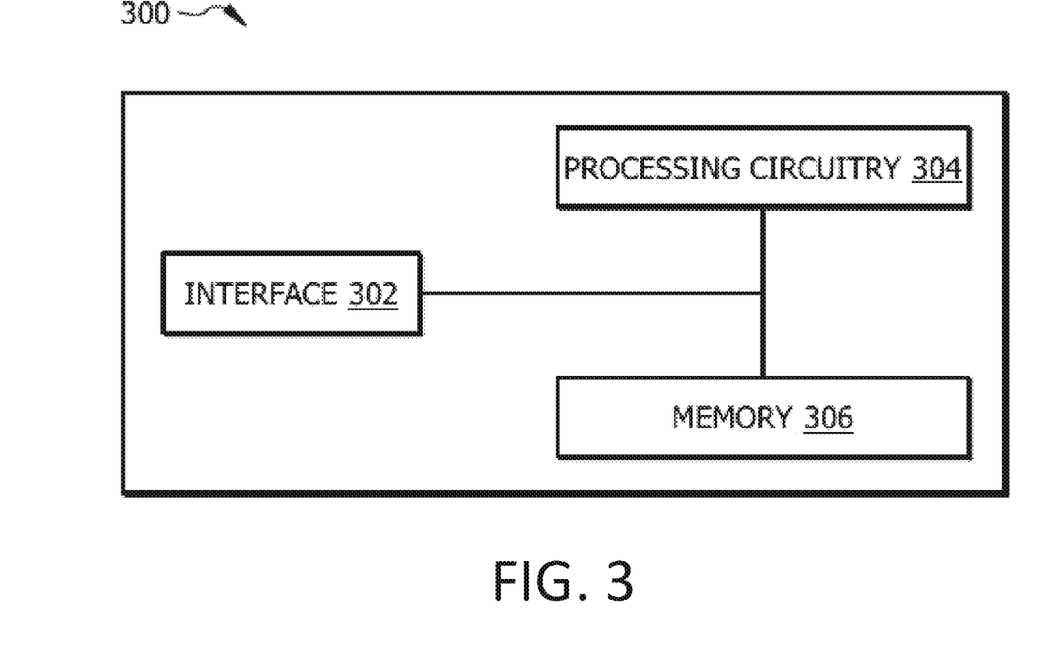
FIG. 3 illustrates an example of computing components that may be used by the optical foveation system of FIG. 1, according to certain embodiments.

Embodiments of the present disclosure and its advantages are best understood by referring to FIGS. 1 through 3 of the drawings, like numerals being used for like and corresponding parts of the various drawings.

Attaining visual acuity with a traditional integral imaging based light field display is currently impractical. Doing so requires either an extremely narrow field of view, or an extremely small pixel pitch. The former presents an uncompelling user experience, the latter is costly to manufacture and virtually impossible for which to generate content. Device makers in the Virtual Reality (VR)/Augmented Reality (AR) space have avoided integral imaging displays because of the problem of too many pixels needed in too small of an area. Furthermore, trying to render and manufacture every pixel in a standard undistorted format is too costly and not currently achievable.

To address these and other difficulties and problems with attaining visual acuity with a traditional integral imaging based light field display, embodiments of the disclosure provide novel optical foveation systems and methods for integral imaging. In some embodiments, a system includes an image sensor coupled to a first optical distortion element, a processing unit, and an electronic display coupled to a second optical distortion element. The image sensor is configured to receive, using a plurality of sensor pixels, a portion of an incoming light field through the first optical distortion element and generate a distorted digitized image from the received portion of the incoming light field. The processing unit is configured to generate a distorted virtual image and to generate a processed distorted image by mixing the distorted virtual image and the distorted digitized image. The electronic display is configured to display, using a plurality of display pixels, the processed distorted image through the second optical distortion element. The second optical distortion element is configured to undistort the processed distorted image in order to produce a portion of an emitted light field.

In general, embodiments disclosed herein use a foveated distortion rendering process in conjunction with an optical element that performs the reverse of the distortion to allow the perception of visual acuity while rendering and displaying fewer pixels. Aspects of the subject technology solve the similar problem of collecting light field data when it is paired with a display that performs a foveated distortion strategy. In another aspect, features of the subject technology dramatically reduce the number of pixels that must be packed within a given area (e.g., cell) under the optical element used for integral imaging (e.g., each lenslet in a micro lens array). This allows for a relatively large (i.e., practical) pixel pitch and field of view. The disclosed embodiments accomplish this by employing a foveated distortion rendering strategy to give the center direction of each display cell more pixels and the periphery fewer pixels.

The optical element is designed to undo the distortion before it reaches the user's eye. The foveated distortion function in some embodiments is based on the visual acuity falloff of the human fovea but could be something different in other embodiments.

It is widely believed that integral imaging strategies, such as micro lens array (MLA) based light fields, are impractical or impossible for resolutions approaching human visual acuity over a field of view approaching human limits. Attempting to do so via conventional methods requires a pixel pitch that is too small to manufacture and a quantity of pixels that is challenging to economically render. In an exemplary embodiment, a method solves this problem by eliminating pixels that would provide no (or negligible) perceptual value based on the resolution drop-off of the eye's fovea.

In a general method embodiment, a target resolution distribution (e.g., human visual acuity falloff) is chosen according to a particular use-case. An integral image (e.g., light field) is rendered in a foveally distorted manner on a display that is covered with optical elements to enable integral imaging. The optical elements will apply distortion to the incoming image and remove distortion from the outgoing image. For example, these optical elements may be a micro lens array (MLA), a holographic element array (HOE), a diffractive optics element array (DOE), a gradient index lenses array (GRIN), or any other optical element.

FIG. 1 illustrates an optical foveation system 100, according to certain embodiments. Optical foveation system 100 includes two optical distortion elements 105: a sensing optical distortion element 105A and an emitting optical distortion element 105B. Optical foveation system 100 also includes an image sensor 140, an electronic display 150, and a processing unit 170. Optical foveation system 100 may be used in extended reality (XR) visors, XR wall portals, XR construction helmets, XR pilot helmets, and certain far eye displays, or any other near-eye display. As used herein, XR may refer to or include Virtual Reality (VR), Augmented Reality (AR), Mixed Reality (MR), and any combination thereof. In some embodiments, optical foveation system 100 may be used in a light field recording or playback device.

In general, optical foveation system 100 generates an emitted light field 160 from an incoming light field 101. To do so, image sensor 140 receives or otherwise captures a portion of incoming light field 101 using a plurality of sensor pixels after incoming light field 101 has passed through optical distortion element 105A. Image sensor 140 generates a distorted digitized image 145 from the received incoming light field 101 and passes the distorted digitized image 145 to processing unit 170. Processing unit 170 generates a distorted virtual image and generates a processed distorted image 175 by mixing the distorted virtual image and the distorted digitized image 145. Processing unit 170 transmits the processed distorted image 175 to electronic display 150. Electronic display 150 displays, using a plurality of display pixels, the processed distorted image 175 through optical distortion element 105B. Optical distortion element 105B undistorts processed distorted image 175 in order to produce emitted light field 160. To summarize, optical foveation system 100 optically distorts (e.g., barrel distortion) the image prior to image capture, digitally processes the distorted version of the image, and then optically removes the distortion after emission. By creating and resolving the image distortion optically in an analog manner, data loss that would otherwise occur (i.e., electronically in a digital manner) is eliminated.

Optical distortion elements 105 (i.e., 105A and 105B) are any physical optical devices, lenses, or lens arrays that are capable of optically distorting a light field (e.g., optical distortion element 105A distorts incoming light field 101 and optical distortion element 105B distorts emitted light field 160. In some embodiments, optical distortion element 105 is any optical element that is capable of introducing a barrel distortion to incoming light field 101 or emitted light field 160. In these embodiments, optical distortion element 105 warps its generated image such that there is more image detail present at the center and less at the periphery. In some embodiments, optical distortion element 105 is any other optical element that is capable of image distortion such as pincushion as well as other types of complex or custom image distortions. In some embodiments, optical distortion element 105 may utilize other types of optics such as gradient index (GRIN) optics (e.g., a lens with an index of refraction that varies through the volume of the refracting medium) and diffractive optics (e.g., a lens where a wavefront of light that passes through it is "shaped" according to the desired effect). A specific embodiment of optical distortion elements 105A-B is illustrated in more detail below in reference to FIGS. 2A-2C.

In general, the curve of distortion of optical distortion elements 105 is selected to create a custom information density map over a light field image (i.e., some regions have a higher pixel count and others of the same size have a lower pixel count). In particular embodiments, the curve of distortion of optical distortion elements 105 is selected to match the natural resolution falloff curve of the human eye. This allows optical foveation system 100 to have a greater pixel density in certain important areas (e.g., there is more image detail present at the center and less at the periphery).

Image sensor 140 includes a plurality of sensor pixels that are configured to detect incoming light field 101 after it passes through optical distortion element 105A. In some embodiments, image sensor 140 includes an array of sensor units. Each sensor unit may be a defined portion of image sensor 140 (e.g., a specific area such as a portion of a rectangular grid) or a specific number or pattern of sensor pixels within image sensor 140. In some embodiments, image sensor 140 is coupled to or otherwise immediately adjacent to optical distortion element 105A. In general, image sensor 140 receives, using its sensor pixels, a portion of incoming light field 101 through optical distortion element 105A and generate distorted digitized image 145.

Electronic display 150 includes a plurality of display pixels that are configured to generate and project electronically-replicated emitted light field 160 through optical distortion element 105B. In some embodiments, electronic display 150 includes an array of display units. Each display unit may be a defined portion of electronic display 150 (e.g., a specific area such as a portion of a rectangular grid) or a specific number or pattern of display pixels within electronic display 150. In some embodiments, electronic display 150 is coupled to or otherwise immediately adjacent to optical distortion element 105B. When electronic display 150 displays processed distorted image 175 through optical distortion element 105B, processed distorted image 175 is undistorted by optical distortion element 105B, thereby producing emitted light field 160.

Processing unit 170 is any appropriate computer processor, discrete logic, or other processing circuitry that is capable of generating processed distorted image 175. In general, processing unit 170 mixes distorted digitized image 145 (i.e., an image that has been optically distorted by optical distortion element 105A) with electronically-distorted virtual world imagery to produce processed distorted image 175. Before mixing, processing unit 170 digitally distorts the stored virtual world imagery in order to match the optical distortion applied by optical distortion element 105A. For example, if optical distortion element 105A introduces a certain barrel distortion to incoming light field 101 (i.e., "real world" imagery), processing unit 170 digitally applies the same barrel distortion to virtual imagery stored in memory before mixing the real world and virtual world imagery to create processed distorted image 175. In some embodiments, the digital distortion applied by processing unit 170 to the virtual imagery may be achieved using a lookup table, a predefined formula, and the like. FIG. 3 illustrates example components of certain embodiments of processing unit 170.

In operation, image sensor 140 receives or otherwise captures a portion of incoming light field 101 using a plurality of sensor pixels after incoming light field 101 has passed through optical distortion element 105A. Image sensor 140 generates a distorted digitized image 145 from the received incoming light field 101 and passes the distorted digitized image 145 to processing unit 170. In embodiments where optical distortion element 105A includes a barrel-distortion lens, the distorted digitized image 145 is a barrel-distorted image as illustrated in FIG. 1. Processing unit 170 generates a processed distorted image 175 from the distorted digitized image 145 and transmits the processed distorted image 175 to electronic display 150. Electronic display 150 displays, using a plurality of display pixels, the processed distorted image 175 through optical distortion element 105B. Optical distortion element 105B undistorts processed distorted image 175 in order to produce emitted light field 160.

In some embodiments, the foveated distortion technique used by optical foveation system 100 is based on the known resolution distribution of the human fovea and the predicted location of the display relative to the eye. To generate the optimal resolution distribution of the display of optical foveation system 100 based on the human eye, the method may start with the angular resolution distribution of the human fovea aligned to the axis of the display. That distribution may be inverted and projected onto the surface of the eye so that when a line is drawn parallel to the axis of the display and through the center of the pupil, the resolution at that point matches the foveal resolution for the angle that line makes with the viewing ray. Next, at each point, the maximum resolution within the radius of the pupil may be used to allow the above process to work for any line through the pupil. Next, the resolutions may be projected back down into angular space, this time onto the display.

The foveated distortion method assigns each selected ray direction a number of pixels based on how different (e.g., degrees off) it is from the central direction. As the direction differs from the central direction, the pixels per degree needed to perceive the display as matching visual acuity drops because the human fovea perceives less resolution in its periphery. Lower pixels per degree in these non-central regions means that the display requires fewer pixels to render an image that would be perceived as full acuity. In this way, regions of the cell for each direction are sized based on how its direction differs from the central direction. Many directions require only a small fraction of the pixels of the central direction. This results in the substantial reduction of the number of pixels needed to represent all the detail of the desired directions.

Each direction may then be rendered in the cell. Several methods could be employed to accomplish this, with one such method being a cell-wide function that maps direction to pixel density in something akin to a normal map shader. This mapping could either change smoothly or discretely over the area of the cell. Next, the optical element (e.g., optical distortion element 105B) covering the cell of the display may be designed to optically reverse the distortion, ensuring that the light rays from the display reach the eye in the correct direction.

A similar method may be taken to light field collection for later display. The optical element performs a reverse foveal distortion so that the surface of the collector can devote more of its active sites to incoming rays that are close to the central (or skewed) direction. Much like the rendering is performed in a manner to change the number of pixels available for each direction region, the sensor firmware would be written to change the collection density over its active areas for each direction region.

Given a display that has an overlaid integral-image-forming optic, a first step may be to implement the foveated distortion function for the display render. This may involve using a known falloff curve to select the appropriate pixels per degree for the offset from center for the direction being rendered. Each direction rendered on the display then may be packed in such a way that the optical elements bend the light rays traveling through them in the proper direction. This means that the area of the display that a direction's view is rendered in may match the area of the optical element that is designed to send rays to the eye for that direction.

Given a sensor that has an overlaid integral-imaging-forming optic, steps like in the display case could be taken to collect incoming light rays at differing densities over its surface based on the chosen foveated distortion function. It is natural to combine this type of foveated distorted sensor with a foveated distorted display to enable a light field viewer of real-world data.

A falloff curve different from the human visual acuity falloff could be used to create the foveation function. The packing of the rendered image could be done differently than described here. For example, the central direction could be rendered in the upper left of the cell, etc. The regions could be discretized at different levels to approach analog (i.e., many discretization levels). Any appropriate packing of the rendered directions in the cell may be used. Other optical elements besides MLA, DOE, HOE, and GRIN could be employed to enable integral imaging.

While FIG. 1 illustrates a particular embodiment of optical foveation system 100 that includes both a sensor side (e.g., optical distortion element 105A and image sensor 140) and a display side (e.g., electronic display 150 and optical distortion element 105B) in conjunction with a processing unit 170, other embodiments may have other configurations to accommodate other applications. As a first example, some embodiments of optical foveation system 100 may be used in VR-only or light field playback applications. In these embodiments, optical foveation system 100 would eliminate the sensor side (e.g., optical distortion element 105A and image sensor 140) and instead include only a display side (e.g., electronic display 150 and optical distortion element 105B) in conjunction with a processing unit 170. Also in these embodiments, processing unit 170 may digitally distort stored virtual world imagery in order to match the reverse of the optical distortion applied by optical distortion element 105B. For example, processing unit 170 may apply a barrel distortion so that optical distortion element 105B can remove the barrel distortion (e.g., through pincushion distortion). As a second example, some embodiments of optical foveation system 100 may be used in pass-through applications. In these embodiments, optical foveation system 100 would eliminate processing unit 170 and instead include only the sensor side (e.g., optical distortion element 105A and image sensor 140) and display side (e.g., electronic display 150 and optical distortion element 105B). In such embodiments, distorted digitized image 145 from image sensor 140 would be passed through to electronic display 150 as processed distorted image 175. As a third example, some embodiments of optical foveation system 100 may be used in light field recording applications. In these embodiments, optical foveation system 100 would eliminate the display side (e.g., electronic display 150 and optical distortion element 105B) and instead include only a sensor side (e.g., optical distortion element 105A and image sensor 140) in conjunction with a processing unit 170. Also in these embodiments, processing unit 170 may digitally undistort distorted digitized image 145. For example, if optical distortion element 105A introduces a barrel distortion into distorted digitized image 145, processing unit 170 digitally applies the reverse of the barrel distortion in order to undistort the distorted digitized image 145. However, distorted digitized image 145 may be stored in memory in a distorted fashion in some embodiments (i.e., processing unit 170 may not digitally undistort distorted digitized image 145).

FIGS. 2A-2C illustrate a specific embodiment of optical foveation system 100 (i.e., optical foveation system 200), according to certain embodiments. Optical foveation system 200 includes a sensor-side collimating lens array 210A, a sensor-side aperture stop array 220A, a sensor-side magnifying lens array 230A, an image sensor array 240, an electronic display array 250, a display-side magnifying lens array 230A, a display-side aperture stop array 220A, and a display-side collimating lens array 210A. While specific arrangements and configurations of the components of optical foveation system 200 are illustrated in these figures, other embodiments may have other arrangements and configurations of these components.

Collimating lens arrays 210A-B each include a plurality of collimating lenses 215. In some embodiments, collimating lenses 215 are arranged in a grid pattern as illustrated in FIGS. 2A-2C, but other embodiments may have other patterns of collimating lenses 215. In general, collimating lenses 215 of collimating lens array 210A collimate light rays of incoming light field 101, and collimating lenses 215 of collimating lens array 210B collimate light rays of emitted light field 160. In some embodiments, collimating lenses 215 of collimating lens array 210A face in an opposite direction from collimating lenses 215 of collimating lens array 210B (e.g., 180 degrees apart).

Aperture stop arrays 220A-B each include a plurality of aperture stops 225. In some embodiments, aperture stops 225 include circular apertures that are arranged in a grid pattern as illustrated in FIGS. 2A-2C, but other embodiments may have other shapes and patterns of aperture stops 225. In general, aperture stops 225 work in conjunction with magnifying lenses 235 to produce the desired distortion effect (e.g., barrel distortion, etc.). In some embodiments, aperture stops 225 of aperture stop array 220A face in an opposite direction from aperture stops 225 of aperture stop array 220B (e.g., 180 degrees apart).

Magnifying lens arrays 230A-B each include a plurality of magnifying lenses 235. In some embodiments, magnifying lenses 235 are arranged in a grid pattern as illustrated in FIGS. 2A-2C, but other embodiments may have other patterns of magnifying lenses 235. In general, magnifying lenses 235 work in conjunction with aperture stops 225 to produce the desired distortion effect (e.g., barrel distortion, etc.). In some embodiments, magnifying lens arrays 230A face in an opposite direction from magnifying lenses 235 of magnifying lens arrays 230B (e.g., 180 degrees apart). In some embodiments, magnifying lenses 235 are biconvex lenses. The proximity and placement of magnifying lenses 235 in combination with aperture stops 225 cause the desired distortion effect (e.g., barrel distortion).

In general, the combination of aperture stops 225 and magnifying lenses 235 may be utilized in some embodiments to creates the desired distortion effect. The placement of that aperture stop 225 in relation to magnifying lens 235 determines the nature of the distortion. If light passes through a properly placed aperture stop 225 of just the right size prior to entering a magnifying lens 235 of the right power situated at the right location, peripheral light rays far away from the optical axis are bent more inward than those at or near the optical axis. This results in more magnification—and thus more image detail—at the center of the image and less at the periphery (i.e., barrel distortion). Reversing the direction of light—or reversing the order in which these elements are encountered—produces the inverse effect (i.e., pincushion distortion). These two effects essentially cancel each other out optically, which is why certain embodiments use the same optical arrangement in reverse for the sensor and the display. The proximity of the aperture stop 225 to the magnifying lens 235, the size of the aperture opening of aperture stop 225, and the power of magnifying lens 235 all factor into the amount of induced distortion, and thus can be varied these to control the resulting distortion to match a desired foveal falloff curve (e.g., for a human eye). These elements may also be used in conjunction with collimating and axis redirection lenses for capturing and displaying light for each plenoptic cell.

In operation of optical foveation system 200 as illustrated in FIG. 2C, image sensor 140 receives or otherwise captures a portion of incoming light field 101 using a plurality of sensor pixels after incoming light field 101 has passed through sensor-side collimating lens 215A, sensor-side aperture stop 225A, and sensor-side magnifying lens 235A (i.e., optical distortion element 105A). Incoming light field 101 includes an optical axis of light field 420A and a notional trace of light rays 430A as it is captured by image sensor 140. Image sensor 140 generates a distorted digitized image 145 from the received incoming light field 101 and passes the distorted digitized image 145 to processing unit 170. Processing unit 170 generates a processed distorted image 175 from the distorted digitized image 145 and transmits the processed distorted image 175 to electronic display 150. Electronic display 150 displays, using a plurality of display pixels, the processed distorted image 175 through display-side magnifying lens 235B, display-side aperture stop 225B, and display-side collimating lens 215B (i.e., optical distortion element 105B). The displayed processed distorted image 175 includes an optical axis of light field 420B and a notional trace of light rays 430B as it is displayed by electronic display 150. Optical distortion element 105B undistorts processed distorted image 175 in order to produce emitted light field 160.

FIG. 3 illustrates an example of computing components 300, in accordance with certain embodiments. Some or all of computing components 300 may be used to implement processing unit 170. The computing components 300 may comprise any suitable hardware and/or software configured to perform the functionality described above. The computing components 300 may be implemented using shared hardware or separate hardware. In certain embodiments, computing components 300 may be distributed in a cloud network environment.

In certain embodiments, the components comprise one or more interface(s) 302, processing circuitry 304, and/or memory(ies) 306. In general, processing circuitry 304 controls the operation and administration of a structure by processing information received from memory 306 and/or interface 302. Memory 306 stores, either permanently or temporarily, data or other information processed by processing circuitry 304 or received from interface 302. Interface 302 receives input, sends output, processes the input and/or output and/or performs other suitable operations. An interface 302 may comprise hardware and/or software.

Examples of interfaces 302 include user interfaces, network interfaces, and internal interfaces. Examples of user interfaces include one or more graphical user interfaces (GUIs), buttons, microphones, speakers, cameras, and so on. Network interfaces receive information from or transmit information through a network, perform processing of information, communicate with other devices, or any combination of the preceding. Network interfaces may comprise any port or connection, real or virtual, wired or wireless, including any suitable hardware and/or software, including protocol conversion and data processing capabilities, to communicate through a LAN, WAN, or other communication system that allows processing circuitry 304 to exchange information with or through a network. Internal interfaces receive and transmit information among internal components of a structure.

Processing circuitry 304 communicatively couples to interface(s) 302 and memory 306, and includes any hardware and/or software that operates to control and process information. Processing circuitry 304 may include a programmable logic device, a microcontroller, a microprocessor, any suitable processing device, or any suitable combination of the preceding. Processing circuitry 304 may execute logic stored in memory 306. The logic is configured to perform functionality described herein. In certain embodiments, the logic is configured to perform the method described with respect to FIG. 2.

Memory 306 includes any one or a combination of volatile or non-volatile local or remote devices suitable for storing information. For example, memory comprises any suitable non-transitory computer readable medium, such as Read Only Memory ("ROM"), Random Access Memory ("RAM"), magnetic storage devices, optical storage devices, or any other suitable information storage device or a combination of these devices. Memory 306 may be local/integrated with the hardware used by processing circuitry 304 and/or remote/external to the hardware used by processing circuitry 304.

The scope of this disclosure is not limited to the example embodiments described or illustrated herein. The scope of this disclosure encompasses all changes, substitutions, variations, alterations, and modifications to the example embodiments described or illustrated herein that a person having ordinary skill in the art would comprehend.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order. That is, the steps of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
an image sensor coupled to a first optical distortion element, the image sensor configured to:
receive, using a plurality of sensor pixels, a portion of an incoming light field through the first optical distortion element; and
generate a distorted digitized image from the received portion of the incoming light field;
a processing unit configured to:
generate a distorted virtual image; and
generate a processed distorted image by mixing the distorted virtual image and the distorted digitized image; and
an electronic display coupled to a second optical distortion element, the electronic display configured to:

display, using a plurality of display pixels, the processed distorted image through the second optical distortion element, wherein the second optical distortion element is configured to undistort the processed distorted image in order to produce a portion of an emitted light field.

2. The system of claim 1, wherein:
the first optical distortion element and the second optical distortion element each comprise a barrel-distortion optical element; and
the distorted digitized image is a barrel-distorted image.

3. The system of claim 1, wherein:
the first optical distortion element and the second optical distortion element each comprise a pincushion-distortion optical element; and
the distorted digitized image is a pincushion-distorted image.

4. The system of claim 1, wherein generating the distorted virtual image comprises:
determining a predetermined distortion applied to the incoming light field by the first optical distortion element; and
applying the predetermined distortion to a virtual image to create the distorted virtual image.

5. The system of claim 1, wherein the first optical distortion element and the second optical distortion element each comprise gradient index (GRIN) optics.

6. The system of claim 1, wherein the first optical distortion element and the second optical distortion element each comprise diffractive optics.

7. The system of claim 1, wherein the first optical distortion element comprises:
a collimating lens array comprising a plurality of collimating lenses;
an aperture stop array comprising a plurality of aperture stops; and
a magnifying lens array comprising a plurality of biconvex magnifying lenses.

8. A method comprising:
receiving, using a plurality of sensor pixels, a portion of an incoming light field through a first optical distortion element;
generating a distorted digitized image from the received portion of the incoming light field;
generating a distorted virtual image;
generating a processed distorted image by mixing the distorted virtual image and the distorted digitized image; and
displaying, using a plurality of display pixels, the processed distorted image through a second optical distortion element, wherein the second optical distortion element is configured to undistort the processed distorted image in order to produce a portion of an emitted light field.

9. The method of claim 8, wherein:
the first optical distortion element and the second optical distortion element each comprise a barrel-distortion optical element; and
the distorted digitized image is a barrel-distorted image.

10. The method of claim 8, wherein:
the first optical distortion element and the second optical distortion element each comprise a pincushion-distortion optical element; and
the distorted digitized image is a pincushion-distorted image.

11. The method of claim 8, wherein generating the distorted virtual image comprises:
determining a predetermined distortion applied to the incoming light field by the first optical distortion element; and
applying the predetermined distortion to a virtual image to create the distorted virtual image.

12. The system of claim 1, wherein the first optical distortion element and the second optical distortion element each comprise gradient index (GRIN) optics.

13. The system of claim 1, wherein the first optical distortion element and the second optical distortion element each comprise diffractive optics.

14. The system of claim 1, wherein the first optical distortion element comprises:
a collimating lens array comprising a plurality of collimating lenses;
an aperture stop array comprising a plurality of aperture stops; and
a magnifying lens array comprising a plurality of biconvex magnifying lenses.

15. One or more computer-readable non-transitory storage media embodying software that is operable when executed to:
access a distorted digitized image comprising a portion of an incoming light field received through a first optical distortion element;
generate a distorted virtual image;
generate a processed distorted image by mixing the distorted virtual image and the distorted digitized image
generate a processed distorted image from the distorted digitized image; and
transmit the processed distorted image for display on an electronic display coupled to a second optical distortion element, wherein the second optical distortion element is configured to undistort the processed distorted image in order to produce a portion of an emitted light field.

16. The storage media of claim 15, wherein:
the first optical distortion element and the second optical distortion element each comprise a barrel-distortion optical element; and
the distorted digitized image is a barrel-distorted image.

17. The storage media of claim 15, wherein:
the first optical distortion element and the second optical distortion element each comprise a pincushion-distortion optical element; and
the distorted digitized image is a pincushion-distorted image.

18. The storage media of claim 15, wherein generating the distorted virtual image comprises:
determining a predetermined distortion applied to the incoming light field by the first optical distortion element; and
applying the predetermined distortion to a virtual image to create the distorted virtual image.

19. The storage media of claim 15, wherein the first optical distortion element and the second optical distortion element each comprise gradient index (GRIN) optics.

20. The storage media of claim 15, wherein the first optical distortion element and the second optical distortion element each comprise diffractive optics.

* * * * *